(12) United States Patent
Nonaka

(10) Patent No.: US 9,219,389 B2
(45) Date of Patent: Dec. 22, 2015

(54) PERMANENT MAGNET ROTATING ELECTRICAL MACHINE

(75) Inventor: Tuyoshi Nonaka, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 421 days.

(21) Appl. No.: 13/603,419

(22) Filed: Sep. 5, 2012

(65) Prior Publication Data

US 2012/0326548 A1    Dec. 27, 2012

Related U.S. Application Data

(63) Continuation of application No. PCT/JP2010/072645, filed on Dec. 16, 2010.

(30) Foreign Application Priority Data

Mar. 15, 2010  (JP) .................................. 2010-057412

(51) Int. Cl.
*H02K 1/27* (2006.01)
*H02K 1/28* (2006.01)
(Continued)

(52) U.S. Cl.
CPC ................ *H02K 1/2773* (2013.01); *H02K 1/27* (2013.01); *H02K 1/276* (2013.01); *H02K 1/28* (2013.01); *H02K 21/12* (2013.01); *H02K 21/14* (2013.01)

(58) Field of Classification Search
CPC ....... H02K 1/27; H02K 1/276; H02K 1/2773; H02K 1/28; H02K 21/12; H02K 21/14
USPC ............. 310/156.19, 156.22, 156.48, 156.08, 310/156.53, 156.56

IPC ........................................................ H02K 1/27
See application file for complete search history.

(56) References Cited

U.S. PATENT DOCUMENTS 4,339,874 A * 7/1982 Mc'Carty et al. ................ 29/598
4,433,261 A * 2/1984 Nashiki et al. ........... 310/156.28
4,543,506 A * 9/1985 Kawada et al. .......... 310/156.59
(Continued)

FOREIGN PATENT DOCUMENTS

JP      07-036459 Y2    10/1991
JP      04-340340       11/1992
(Continued)

OTHER PUBLICATIONS

Chinese Office Action for corresponding CN Application No. 201080065405.3, Mar. 5, 2014.
(Continued)

*Primary Examiner* — John K Kim
(74) *Attorney, Agent, or Firm* — Mori & Ward, LLP

(57) ABSTRACT

A permanent magnet rotating electrical machine includes a stator and a rotatable, approximately cylindrical rotor. The rotor includes a shaft, rotor cores, radial permanent magnets, and side plates. The shaft includes projected and depressed engagement portions. The rotor cores are separated from each other on a magnetic pole basis. The rotor cores constitute circumferentially arranged pole shoes. The radial permanent magnets are each on a circumferential side of a pole shoe among the pole shoes. Each of the radial permanent magnets is engaged with an engagement portion among the engagement portions of the shaft. The side plates are on axial ends of the rotor. The side plates support the rotor cores and the permanent magnets in a radial direction of the rotor.

16 Claims, 8 Drawing Sheets

(51) Int. Cl.
　　*H02K 21/12* (2006.01)
　　*H02K 21/14* (2006.01)

(56) References Cited

U.S. PATENT DOCUMENTS

| | | | | |
|---|---|---|---|---|
| 4,631,807 | A | * 12/1986 | Kawada et al. | 29/598 |
| 4,674,178 | A | * 6/1987 | Patel | 29/598 |
| 4,700,096 | A | * 10/1987 | Epars | 310/153 |
| 5,010,266 | A | * 4/1991 | Uchida | 310/156.22 |
| 5,091,668 | A | * 2/1992 | Cuenot et al. | 310/156.61 |
| 5,157,297 | A | * 10/1992 | Uchida | 310/156.61 |
| 5,786,650 | A | 7/1998 | Uchida et al. | |
| 5,829,120 | A | 11/1998 | Uchida et al. | |
| 5,939,810 | A | * 8/1999 | Uchida et al. | 310/156.57 |
| 6,426,576 | B1 | * 7/2002 | Varenne | 310/156.09 |
| 2004/0004407 | A1 | * 1/2004 | Laurent et al. | 310/156.48 |
| 2009/0195101 | A1 | * 8/2009 | Yang et al. | 310/156.22 |
| 2009/0309448 | A1 | * 12/2009 | Yang et al. | 310/156.22 |
| 2011/0254399 | A1 | * 10/2011 | Blanc et al. | 310/156.22 |
| 2012/0326548 | A1 | * 12/2012 | Nonaka | 310/156.19 |

FOREIGN PATENT DOCUMENTS

| | | |
|---|---|---|
| JP | 3224890 B2 | 9/1994 |
| JP | 2008-295178 | 12/2008 |
| JP | 2009-077469 | 4/2009 |

OTHER PUBLICATIONS

International Search Report for corresponding International Application No. PCT/JP2010/072645, Mar. 8, 2011.
Written Opinion for corresponding International Application No. PCT/JP2010/072645, Mar. 8, 2011.
Japanese Office Action for corresponding JP Application No. 2012-505457, Jan. 7, 2014.
Chinese Office Action for corresponding CN Application No. 201080065405.3, Nov. 14, 2014.
Chinese Office Action for corresponding CN Application No. 201080065405.3, May 7, 2015.

* cited by examiner

A    B

PERMANENT MAGNET ROTATING ELECTRICAL MACHINE

CROSS-REFERENCE TO RELATED APPLICATIONS

The present application is a continuation application of International Application No. PCT/JP2010/072645, filed Dec. 16, 2010, which claims priority to Japanese Patent Application No. 2010-057412, filed Mar. 15, 2010. The contents of these applications are incorporated herein by reference in their entirety.

BACKGROUND OF THE INVENTION

1. Field of the Invention

The present invention relates to a permanent magnet rotating electrical machine.

2. Discussion of the Background

Japanese Examined Utility Model Application Publication No. 7-36459, on page 9 and in FIG. 1, discloses a permanent magnet rotating electrical machine that includes a stator and a rotatable, approximately cylindrical rotor. The rotor includes a rotor core and the same number of permanent magnets as the number of magnetic poles. The rotor core constitutes pole shoes disposed in circumferential arrangement. Each of the permanent magnets is radially disposed between two of the pole shoes. In the rotor, magnetic fluxes are generated on the permanent magnets and directed to the circumference of the pole shoes, thus obtaining the magnetic poles.

FIG. 7 is a cross-sectional view of the rotor of the conventional permanent magnet rotating electrical machine. As shown in FIG. 7, the permanent magnet rotating electrical machine includes a stator and a rotatable, approximately cylindrical rotor.

When permanent magnets 3 on the circumferential sides of a pole shoe 2b generate magnetic fluxes at the respective magnetic flux generating surfaces of the permanent magnets 3, the magnetic fluxes are concentrated on the circumference of the pole shoe 2b, and this increases the gap magnetic flux density between the stator and the rotor, resulting in increased torque. A rotor core 2 includes a plurality of magnet accommodating holes 2d and pole shoes 2b integral with each other. When magnetic fluxes are generated on the magnetic flux generating surfaces of the permanent magnets, some of the magnetic fluxes become leakage magnetic fluxes returning to the permanent magnets in the rotor instead of reaching the circumference of the pole shoe 2b. It is important to reduce leakage magnetic fluxes for improving motor performance.

In an attempt to reduce leakage magnetic fluxes, the rotor core 2 of this conventional example includes a partially removed outer bridge 2e, a hole 4, and a reinforcing member 7. The partially removed outer bridge 2e is disposed over the outer end of each permanent magnet 3. The hole 4 is punched through an inner bridge 2a of the rotor core between two of the permanent magnets 3. The reinforcing member 7 is accommodated in the punched hole 4. The reinforcing member 7 is nonmagnetic and can be regarded as a void magnetically. When magnetic fluxes are generated on the permanent magnets 3, some of the magnetic fluxes become leakage magnetic fluxes returning to the permanent magnets 3 by way of joint portions 2c on the circumferential sides of each punched hole 4 and by way of the inner bridges 2a. The existence of the punched hole 4, however, keeps the leakage magnetic fluxes within restricted magnitude ranges.

Since the permanent magnets 3 are supported by the rotor core 2, the centrifugal force of the permanent magnets 3 is supported by the rotor core 2, while the toque of the permanent magnets 3 and the rotor core 2 is supported by a shaft 9 via the rotor core 2.

Another permanent magnet rotating electrical machine is disclosed in Japanese Patent Publication No. 3224890, on page 9 and in FIG. 1. In the rotor of the permanent magnet rotating electrical machine, the toque of permanent magnets and rotor cores on their circumferences is supported by the shaft through side plates.

FIG. 8A is a side view of the rotor of the other conventional permanent magnet rotating electrical machine, and FIG. 8B is a cross-sectional view of the rotor. As shown in FIGS. 8A and 8B, the permanent magnet rotating electrical machine includes a stator and the rotor 10, which is rotatable and has an approximately cylindrical shape.

As shown in FIGS. 8A and 8B, the rotor 10 includes rotor cores 16 and the same number of permanent magnets 14 as the number of magnetic poles. The rotor cores 16 are separated from each other on a magnetic pole basis and constitute pole shoes disposed in circumferential arrangement. Each of the permanent magnets 14 is radially disposed between two of the pole shoes. The rotor cores 16 and the permanent magnets 14 are secured between side plates 24. The rotor cores 16 are separated into independent rotor cores each corresponding to one pole, and secured to the side plates 24 through respective rods 22. The side plates 24 are secured to a shaft 12.

The rotor cores 16 are separated from each other on a magnetic pole basis by the permanent magnets 14, and this allegedly reduces leakage magnetic fluxes shortcutting from the N pole to the S pole. Accordingly, the magnetic fluxes generated on the permanent magnets 14 are for the most part directed to the gap between the stator and the rotor 10, resulting in an increased possible maximum torque compared with permanent magnet rotating electrical machines with bridges.

SUMMARY OF THE INVENTION

According to one aspect of the present invention, a permanent magnet rotating electrical machine includes a stator and a rotatable, approximately cylindrical rotor. The rotor includes a shaft, rotor cores, radial permanent magnets, and side plates. The shaft includes projected and depressed engagement portions. The rotor cores are separated from each other on a magnetic pole basis. The rotor cores constitute circumferentially arranged pole shoes. The radial permanent magnets are each on a circumferential side of a pole shoe among the pole shoes. Each of the radial permanent magnets is engaged with an engagement portion among the engagement portions of the shaft. The side plates are on axial ends of the rotor. The side plates support the rotor cores and the permanent magnets in a radial direction of the rotor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
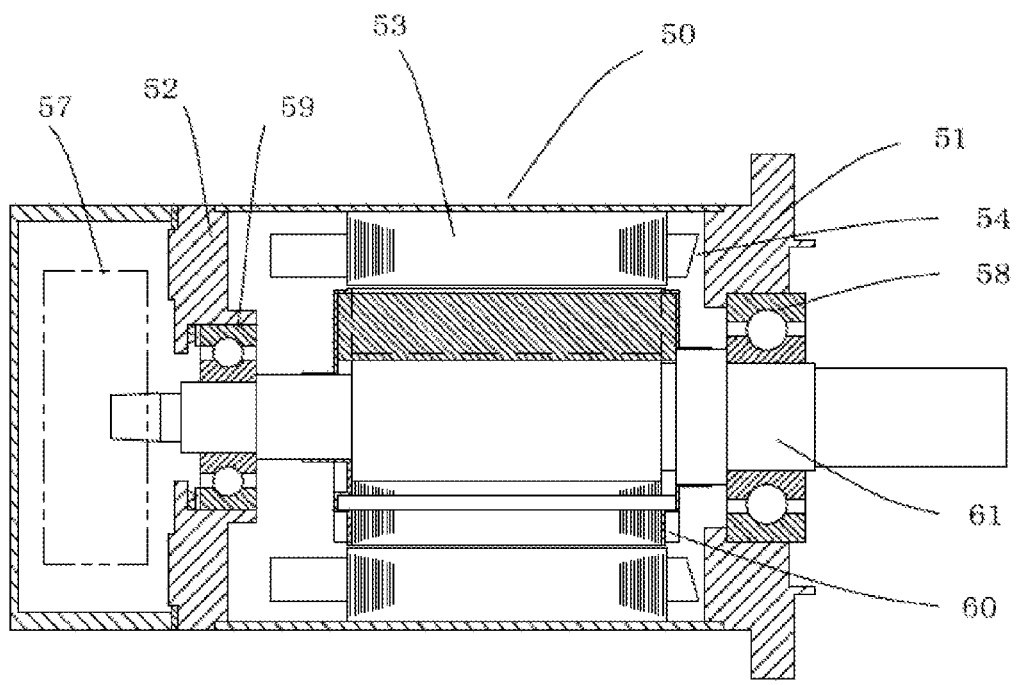
FIG. 1 is a longitudinal sectional view of a permanent magnet rotating electrical machine according to an embodiment.

The embodiments will now be described with reference to the accompanying drawings, wherein like reference numerals designate corresponding or identical elements throughout the various drawings.

FIG. 1 is a longitudinal sectional view of a permanent magnet rotating electrical machine according to the embodiment. The permanent magnet rotating electrical machine finds applications in AC servomotors. As shown in FIG. 1, the permanent magnet rotating electrical machine includes a stator and a rotatable, approximately cylindrical rotor 60. The rotor 60 is rotatably supported by a load-side bracket 51 and an anti-load side bracket 52 via a load-side bearing 58 and an anti-load side bearing 59. An encoder 57, which detects the rotational position of the rotor 60, is disposed on the anti-load side end of a shaft 61. The stator includes stator cores 53 and stator coils 54. The load-side bracket 51 and the anti-load side bracket 52 are joined to a frame 50 with bolts, not shown.

Figure 2:
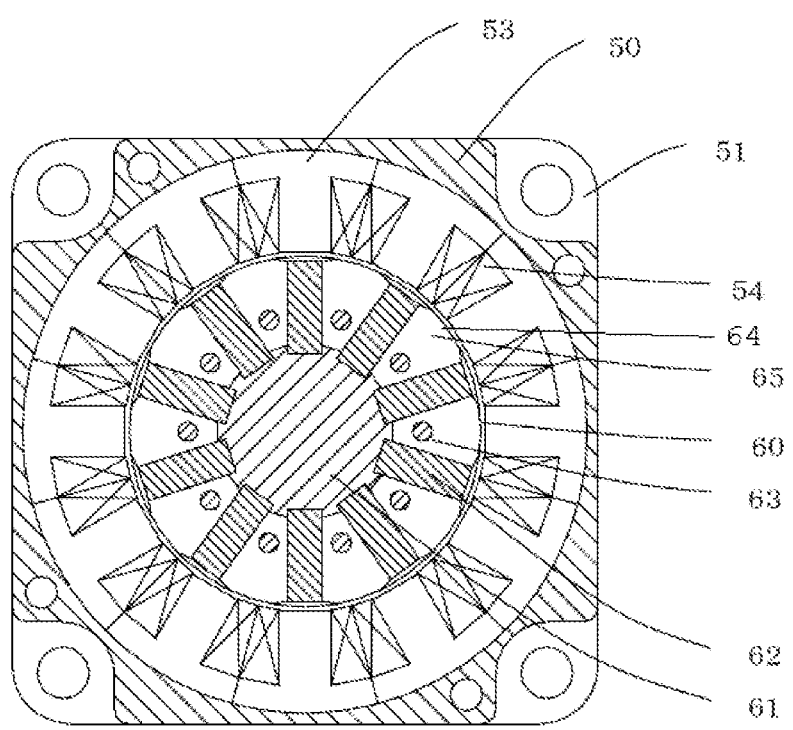
FIG. 2 is a cross-sectional view of the permanent magnet rotating electrical machine.

FIG. 2 is a cross-sectional view of the permanent magnet rotating electrical machine. As shown in FIG. 2, the stator includes the stator cores 53 and the stator coils 54, and is secured to the frame 50. The stator cores 53 are separated from each other on a tooth basis. The stator coils 54 are wound in concentrated winding. The rotor 60 includes rotor cores 65 and radial permanent magnets 62, and forms ten magnetic poles. The rotor cores 65 are separated from each other on a magnetic pole basis and constitute circumferentially arranged pole shoes 64. Each of the permanent magnets 62 is disposed on a circumferential side of a pole shoe among the pole shoes 64. Similarly to conventional permanent magnet rotating electrical machines, when magnetic fluxes are generated on the magnetic flux generating surfaces of permanent magnets 62 disposed on the circumferential sides of a rotor core 65 constituting a pole shoe 64, the magnetic fluxes are concentrated on the circumference of the pole shoe 64, so as to increase the gap magnetic flux density between the stator and the rotor 60 and to obtain increased torque. The magnetic fluxes past the stator core 53 become field magnetic fluxes crossing the stator coils 54. In conventional permanent magnet rotating electrical machines, when magnetic fluxes are generated on the magnetic flux generating surfaces of the permanent magnets, some of the magnetic fluxes become leakage magnetic fluxes returning to the permanent magnets in the rotor instead of reaching the circumference of the pole shoe 2b. It is important to reduce leakage magnetic fluxes for improving motor performance.

Figure 3:
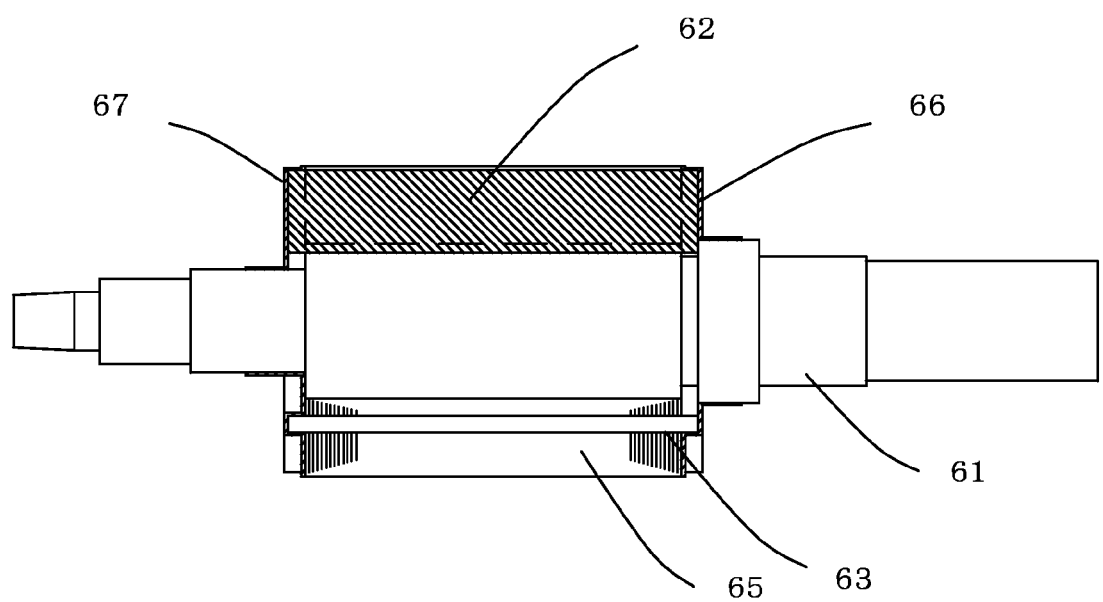
FIG. 3 is a longitudinal sectional view of a rotor of the permanent magnet rotating electrical machine.

FIG. 3 is a longitudinal sectional view of the rotor 60 of the permanent magnet rotating electrical machine. As shown in FIG. 3, the rotor 60 includes, on its axial ends, a load-side side plate 66 and an anti-load-side side plate 67. The load-side side plate 66 and the anti-load-side side plate 67 support the permanent magnets 62 and the rotor cores 65 in radial directions. A rod 63 penetrates through each rotor core 65 in an axial direction of the rotor core 65 so that the rotor core 65 is supported by the load-side side plate 66 and by the anti-load-side side plate 67 via the rod 63. This makes the rotor 60 structurally strong against centrifugal force. The load-side side plate 66 and the anti-load-side side plate 67 are formed by press molding nonmagnetic metal plates such as of stainless. It is also possible to use resins under less stringent strength and heat resistance requirements. The shaft 61 is similarly made of a nonmagnetic metal such as stainless. The nonmagnetic nature of these metal materials eliminates or minimizes an increase in leakage magnetic fluxes. The rod 63 is made of iron considering facilitated passing of magnetic fluxes.

Figure 4:
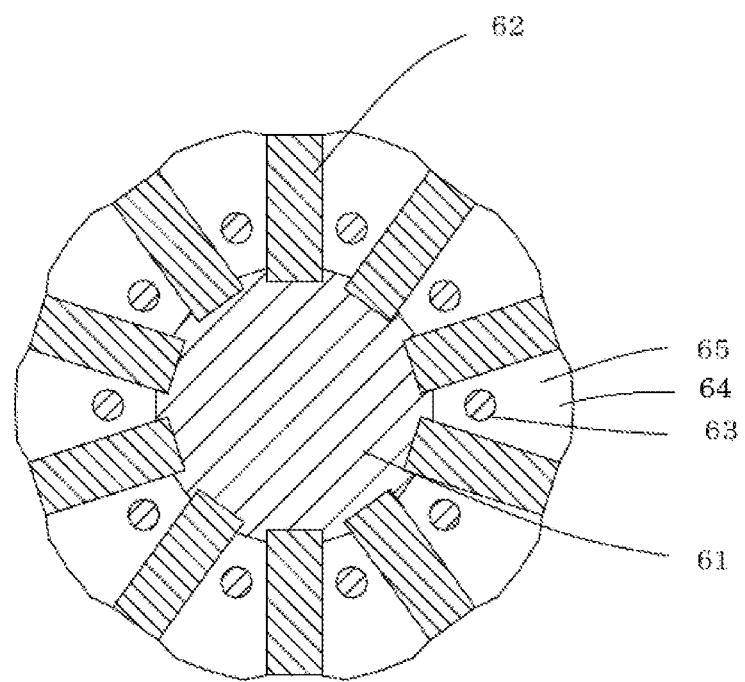
FIG. 4 is a cross-sectional view of the rotor of the permanent magnet rotating electrical machine.

FIG. 4 is a cross-sectional view of the rotor 60 of the permanent magnet rotating electrical machine. As shown in FIG. 4, the radial permanent magnets 62 are plate shaped components, each magnetized in a direction perpendicular to a large surface. The rotor cores 65 are ten separate components, each being a laminate of electromagnetic plates. Since the rotor cores 65 are separated from each other, no outer bridges or inner bridges for the permanent magnets 62 exist. This reduces leakage magnetic fluxes shortcutting directly from the N pole to the S pole of each permanent magnet 62, resulting in an increased possible maximum torque.

The inner end of each of the radial permanent magnets 62 is engaged with the shaft 61 at its projected and depressed engagement portion. At the engagement portion of each of the ten permanent magnets 62, the load torque acts on the thickness of each permanent magnet 62 as a shearing load. This ensures a structure that withstands intensive torque as compared with, for example, Japanese Patent Publication No. 3224890, in which the torque is supported by the shaft via side plates. The structure of the rotor 60 according to the embodiment becomes more advantageous when the magnetic poles of the rotor 60 have longer axial lengths.

Figure 5:
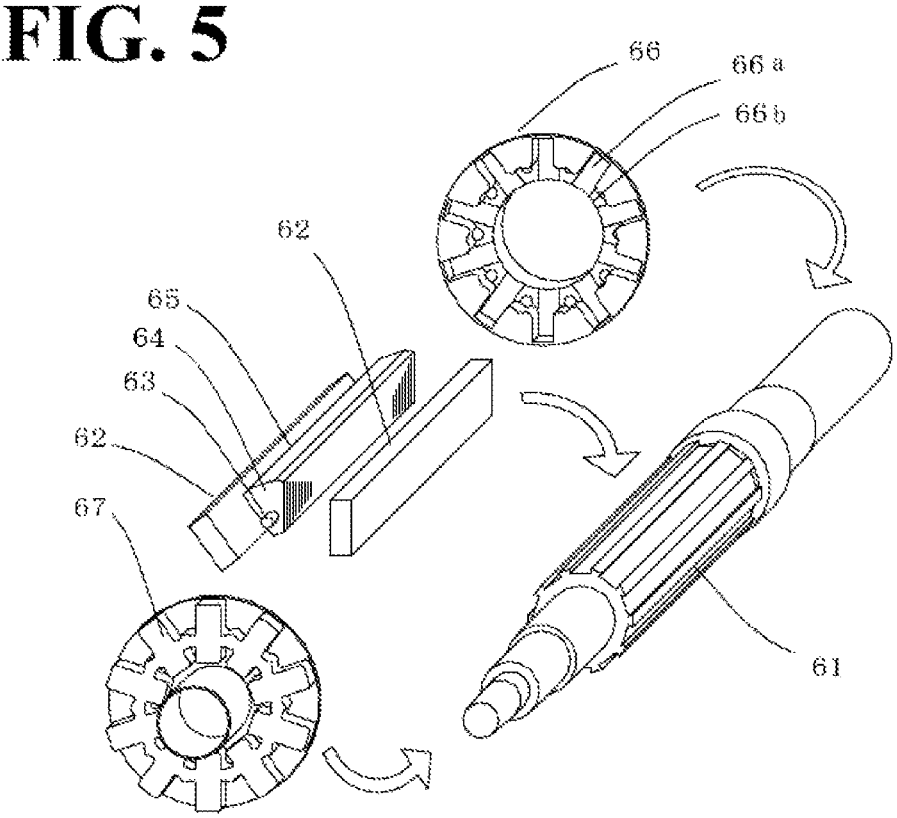
FIG. 5 is a view of the rotor illustrating components of the rotor.

FIG. 5 is a view of the rotor illustrating components of the rotor 60. As shown in FIG. 5, the shaft 61 includes projections and depressions to serve as engagement portions for the permanent magnets 62. The rotor cores 65 are separated from each other on a magnetic pole basis and constitute the circumferentially arranged pole shoes 64. The radial permanent magnets 62 are disposed on circumferential sides of the rotor core 65, and engaged with the projected and depressed engagement portions of the shaft 61. The rotor cores 65 and the permanent magnets 62 are supported by the load-side side plate 66 and by the anti-load-side side plate 67, which are disposed on the axial ends of the rotor 60.

Each rod 63 penetrates through its corresponding rotor core 65 constituting a pole shoe 64, which is a laminate of electromagnetic plates. The load-side side plate 66 includes permanent magnet accommodating holes 66a, which form engagement portions of the load-side side plate 66, and rod accommodating holes 66b. The permanent magnet accommodating holes 66a are engaged with the permanent magnets 62, while the rod accommodating holes 66b are engaged with the rods 63. Likewise, the anti-load-side side plate 67 includes permanent magnet accommodating holes 66a, which form engagement portions of the anti-load-side side plate 67, and rod accommodating holes 66b. This structure ensures that when centrifugal force occurs, the permanent magnets 62 and the rotor cores 65 are supported by the load-side side plate 66 and the anti-load-side side plate 67, while when load torque occurs, the permanent magnets 62 and the rotor cores 65 are supported by the engagement portions between the permanent magnets 62 and the shaft 61.

Figure 6:
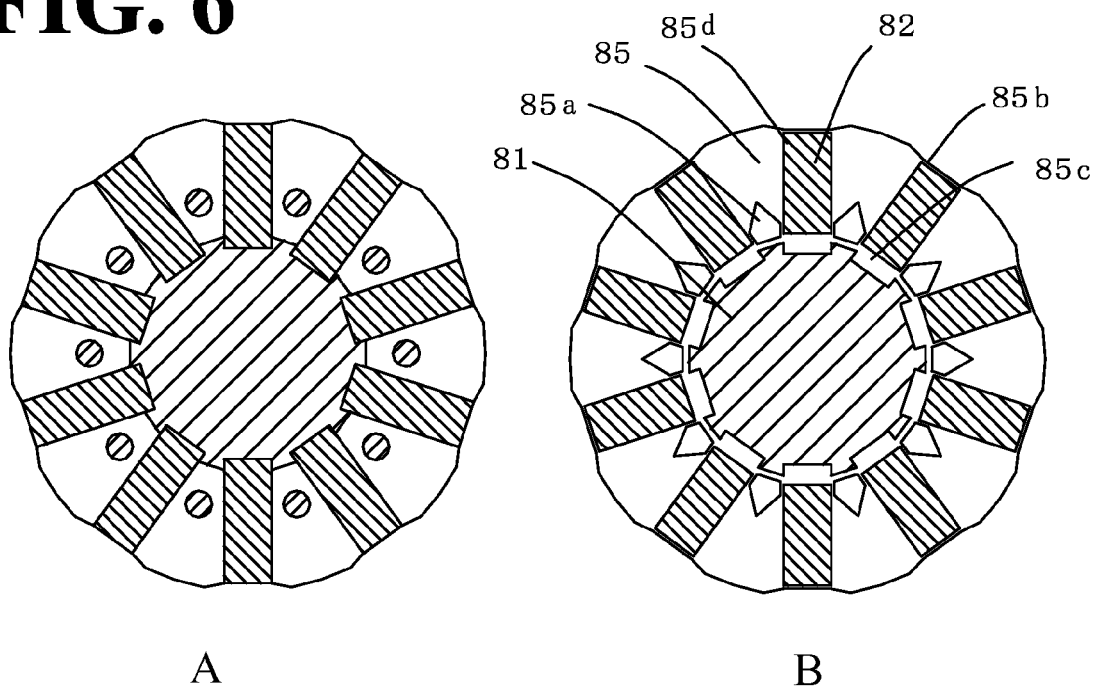
FIG. 6 shows results of a magnetic field analysis for torque characteristics.
Figure 6:
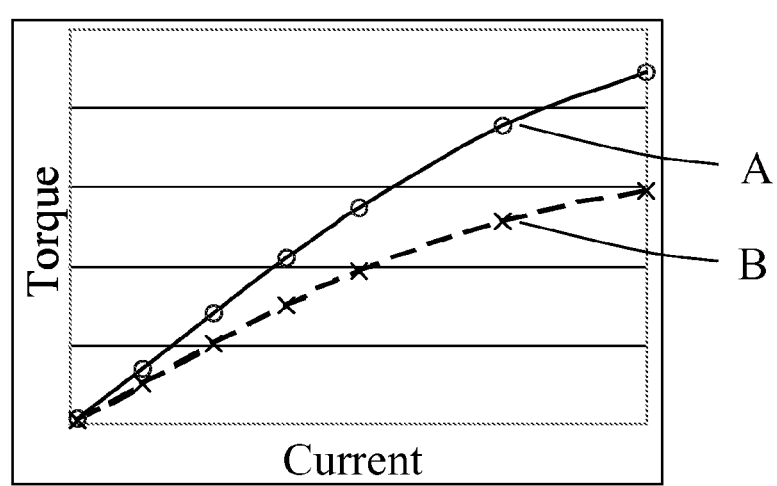
Figure 7:
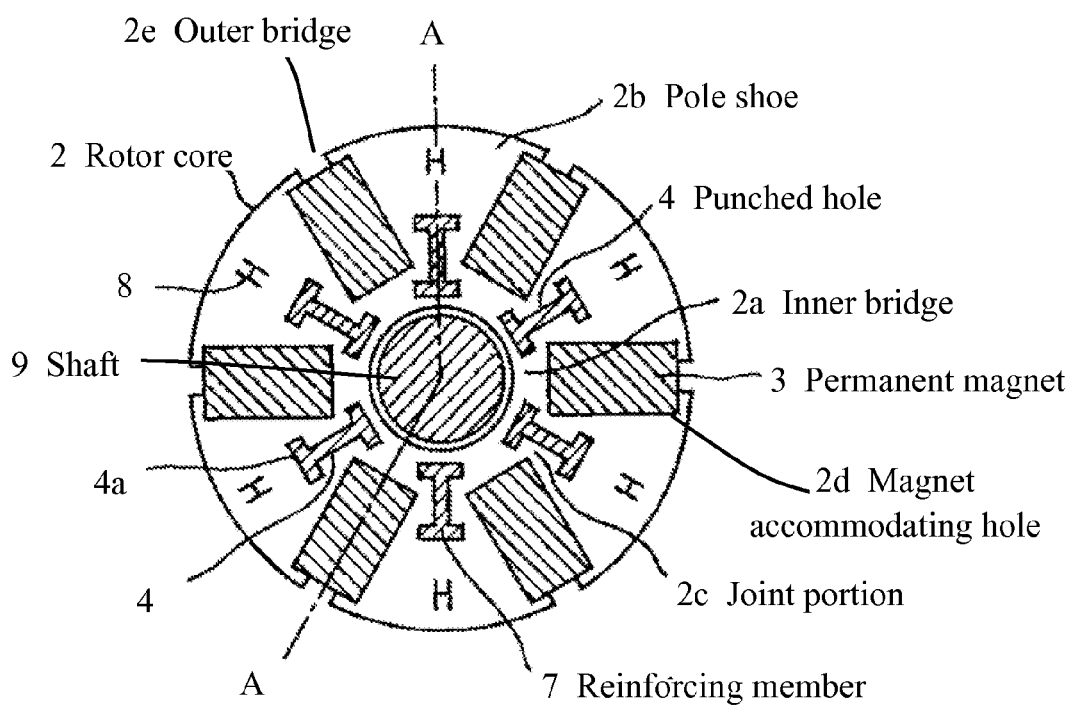
FIG. 7 is a cross-sectional view of a conventional permanent magnet rotating electrical machine.
Figure 8A:
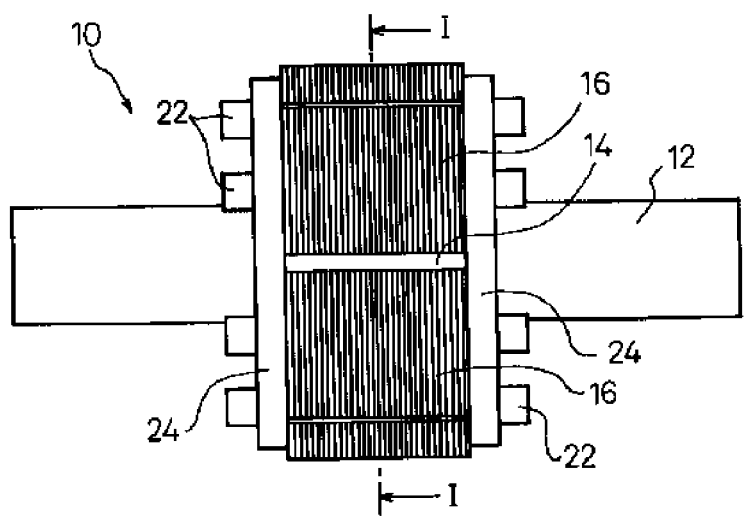
FIG. 8A is a side view of a rotor of another conventional permanent magnet rotating electrical machine.
Figure 8B:
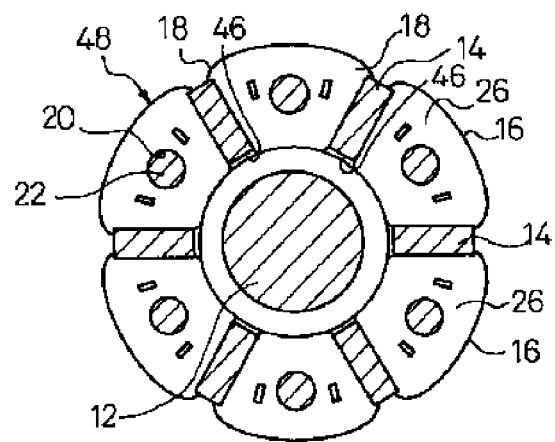
FIG. 8B is a cross-sectional view of the rotor of the other conventional permanent magnet rotating electrical machine.

FIG. 6 shows results of a magnetic field analysis for torque characteristics to prove the effectiveness of this embodiment. As shown in FIG. 6, a rotating electrical machine A employing the rotor according to this embodiment is compared with a rotating electrical machine B employing a conventional rotor with bridges. The conventional rotor has an approximately same external shape as the shape of the rotating electrical machine A. As well as the rotors of the approximately the same external shapes, shafts 81 of the approximately the same external shapes are used in the comparison. This is because shafts in many cases have specified sizes based on strength and rigidity.

The rotor core, 85, of the conventional rotor has an integral structure of magnet accommodating holes 85d and outer bridges 85b and inner bridges 85c. The outer bridges 85b and the inner bridges 85c are respectively disposed at the outer ends and inner ends of the respective magnet accommodating holes 85d. Additionally, voids 85a are provided to reduce internally oriented leakage magnetic fluxes. The permanent magnets 82 of the conventional rotor have shorter radial lengths than those of the permanent magnets of the rotor considering the need to provide the outer bridge 85b and the inner bridge 85c.

The comparison proves that the permanent magnet rotating electrical machine A, which uses the rotor according to this embodiment, realizes a significant increase in the possible maximum torque generated by motor, as compared with the permanent magnet rotating electrical machine B, which uses the conventional rotor. This is because the permanent magnet rotating electrical machine A uses larger permanent magnets than the permanent magnets of the permanent magnet rotating electrical machine B, and because the permanent magnet rotating electrical machine A reduces leakage magnetic fluxes.

Thus, the permanent magnet rotating electrical machine according to this embodiment ensures a rotor that reduces leakage magnetic fluxes, increases the possible maximum torque, and withstands intensive torque.

This embodiment is distinguished over Japanese Examined Utility Model Application Publication No. 7-36459 in that this embodiment provides rotor cores that are separated from each other on a magnetic pole basis, instead of being an integral rotor core, and that constitute pole shoes. This embodiment is distinguished over Japanese Patent Publication No. 3224890 in that the torque acting on the permanent magnets and rotor cores acts on the thickness of the permanent magnets as a shearing load at the engagement portions between the permanent magnets and the shaft, instead at the side plates.

The permanent magnet rotating electrical machine according to this embodiment increases the possible maximum torque generated by the rotating electrical machine, and finds applications in general purpose motors as well as in servo motors.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A permanent magnet rotating electrical machine comprising:
   a stator; and
   a rotatable, approximately cylindrical rotor, the rotor comprising:
      a shaft comprising engagement portions formed of projections and depressions;
      rotor cores separated from each other, the rotor cores constituting circumferentially arranged pole shoes;
      radially extending permanent magnets each on a circumferential side of a pole shoe among the pole shoes, each of the permanent magnets being engaged with a respective engagement portion among the engagement portions of the shaft; and
      side plates on axial ends of the rotor, the side plates supporting the rotor cores and the permanent magnets against centrifugal force acting in a direction of the rotor, the side plates including engagement portions which are engaged with the permanent magnets to support the permanent magnets against the centrifugal force, each of the engagement portions of the side plates including a depressed portion,
      wherein opposing side surfaces of each of the permanent magnets contact the projections of the respective engagement portions of the shaft,
      wherein peripheral end surfaces of the permanent magnets are engaged with the engagement portions of side plates, the peripheral end surfaces of the magnets being disposed on outer sides of the permanent magnets in an axial direction of the rotor such that the depressed portions entirely cover each of the peripheral end surfaces of the permanent magnets, and
      wherein the permanent magnets are supported by the engagement portions of the side plates on opposing sides of the magnets about the axial direction of the rotor.

2. The permanent magnet rotating electrical machine according to claim 1, wherein the rotor further comprises rods penetrating through the respective rotor cores in an axial direction of the respective rotor cores so that the rotor cores are supported by the side plates via the respective rods.

3. The permanent magnet rotating electrical machine according to claim 1, wherein the rotor cores are separated from each other, and the permanent magnets are separated from each other.

4. The permanent magnet rotating electrical machine according to claim 1, wherein the shaft comprises a nonmagnetic metal.

5. The permanent magnet rotating electrical machine according to claim 1, wherein the side plates each comprise a nonmagnetic metal.

6. The permanent magnet rotating electrical machine according to claim 1, wherein the side plates each comprise a press-molded nonmagnetic metal.

7. The permanent magnet rotating electrical machine according to claim 1, wherein the rotor comprises a preliminarily magnetized magnet.

8. The permanent magnet rotating electrical machine according to claim 1, wherein the permanent magnets have respective inner surfaces that contact the depressions of the respective engagement portions.

9. The permanent magnet rotating electrical machine according to claim 1, wherein each permanent magnet has an outer surface and each rotor core has an outer surface, the outer surfaces of the rotor cores and the outer surfaces of the permanent magnets together form a continuous outer surface of the rotor.

10. The permanent magnet rotating electrical machine according to claim 1, wherein each permanent magnet has an outer surface and each rotor core has an outer surface, the outer surface of each permanent magnet adjoining the outer surfaces of adjacent rotor cores.

11. The permanent magnet rotating electrical machine according to claim 1, wherein the depressed portions of the engagement portions of the side plates are formed by portions of the side plates that are hollowed in the axial direction of the rotor without penetrating the engagement portions of the side plates.

12. The permanent magnet rotating electrical machine according to claim 1, wherein the shaft is made of a nonmagnetic metal, and wherein the permanent magnets have respective inner surfaces that contact the depressions of the respective engagement portions of the side plates.

13. The permanent magnet rotating electrical machine according to claim 1, wherein the shaft is solid.

14. The permanent magnet rotating electrical machine according to claim 2, wherein the side plates include rod engagement portions that cover peripheral end surfaces of each of the rods.

15. The permanent magnet rotating electrical machine according to claim 1, wherein the rotor cores and the permanents magnets oppose each other about a circumferential direction of the permanent magnet rotating electrical machine.

16. The permanent magnet rotating electrical machine according to claim 1, wherein the engagement portions of the side plates directly support outer side surfaces of each of the permanent magnets.

* * * * *